US008624421B2

(12) United States Patent
Ippolito

(10) Patent No.: US 8,624,421 B2
(45) Date of Patent: Jan. 7, 2014

(54) INFRASTRUCTURE FOR DRIVING AND ASSISTING TAKE-OFF OF AIRFOILS FOR TROPOSPHERIC AEOLIAN GENERATOR

(75) Inventor: Massimo Ippolito, Berzano di San Pietro (IT)

(73) Assignee: Kite Gen Research S.r.l, Chieri (IT)

( * ) Notice: Subject to any disclaimer, the term of this patent is extended or adjusted under 35 U.S.C. 154(b) by 415 days.

(21) Appl. No.: 12/736,960

(22) PCT Filed: May 29, 2009

(86) PCT No.: PCT/IT2009/000236
§ 371 (c)(1),
(2), (4) Date: Nov. 26, 2010

(87) PCT Pub. No.: WO2009/147692
PCT Pub. Date: Dec. 10, 2009

(65) Prior Publication Data
US 2011/0074161 A1    Mar. 31, 2011

(30) Foreign Application Priority Data
Jun. 4, 2008  (IT) .............................. TO2008A0423

(51) Int. Cl.
*F03D 9/00* (2006.01)
(52) U.S. Cl.
USPC .............................. 290/55; 290/44; 244/153

(58) Field of Classification Search
USPC ....................................... 290/55, 44; 244/153
See application file for complete search history.

(56) References Cited

U.S. PATENT DOCUMENTS

| | | | | |
|---|---|---|---|---|
| 4,470,563 A * | 9/1984 | Engelsman | ..................... | 244/33 |
| 4,491,739 A * | 1/1985 | Watson | ......................... | 290/44 |
| 4,708,592 A * | 11/1987 | Krolick et al. | ................ | 416/176 |
| 4,832,571 A * | 5/1989 | Carrol | ....................... | 416/132 B |
| 6,523,781 B2 * | 2/2003 | Ragner | ...................... | 244/153 R |
| 6,616,402 B2 * | 9/2003 | Selsam | .......................... | 415/3.1 |
| 7,847,426 B1 * | 12/2010 | Griffith et al. | ................. | 290/44 |
| 2008/0231058 A1 * | 9/2008 | Nicholson et al. | ............. | 290/55 |
| 2010/0221112 A1 * | 9/2010 | Bevirt et al. | .................. | 416/135 |
| 2011/0127775 A1 * | 6/2011 | Bevirt | ............................ | 290/55 |

FOREIGN PATENT DOCUMENTS

GB    2439215    12/2007
WO    WO2008034421    3/2008

* cited by examiner

*Primary Examiner* — Michael Zarroli
(74) *Attorney, Agent, or Firm* — Law Offices of John A. Parrish

(57) ABSTRACT

An infrastructure for tropospheric aeolian generator is described, which comprises a rotary basement (1), at least one orientable arm (2), at least one ventilation plant (3), at least one system (4) for supporting at least one wing (7), and a driving system (5) of control cables (6) of the wing (7).

25 Claims, 6 Drawing Sheets

INFRASTRUCTURE FOR DRIVING AND ASSISTING TAKE-OFF OF AIRFOILS FOR TROPOSPHERIC AEOLIAN GENERATOR

TECHNICAL FIELD

The present invention refers to an optimised structure for driving and assisted take-off of airfoils for tropospheric aeolian generator.

BACKGROUND

Renewable energy sources have typically the problem of being available in a diluted form in time and space; from the sun, it is possible to directly obtain mean electric powers around 20 W per square meter, while wind farms of traditional aeolian towers generate around 4 W per square meter, and with all other sources like biomass, sea forces, stimulated geothermal sources, levels are lower than one watt per square meter. In order to produce meaningful amounts of energy, machines and system for collecting and converting energy from renewable sources must therefore have big or immense sizes. In case of photovoltaic, or thermodynamic sun energy, it is necessary to occupy large extensions of territory with panels or with mirrors, while with the conventional aeolian system it is necessary to have big towers arranged at distances that are as much as possible nearby, and organised in wind farms.

The most important element in evaluating these works, even before the feasibility and financial return evaluations, is the necessary energy for making the systems. The financial return could be positive even in situations of insufficient energy return, due to market deformations linked to government helps. There could be a situation where the intention of producing energy from a renewable source starts such a burdensome implementing process from the energy point of view that the operating years of the system will not be sufficient to return. In order to more deeply specify the question, it is necessary to refer to concepts, typically described in literature, of ERoEI, emergy, exergy: however, it is not object of this document to further explain these facts.

SUMMARY

This application uses the concept of tropospheric aeolian generator, already patented by the Applicant and granted as Italian Patent n. 1344401, which provides those optimisation elements that allow minimising the energy investments necessary for realising and managing the plant, making the plant itself as new efficiency and energy return reference. An important parameter for generating productivity is the equivalent number of hours/year of machine operation. Once the investment has been made and the machine is operating, it is necessary to maximise the equivalent operating hours, in order to anticipate the economic and energy return. The tropospheric aeolian system has the advantage of being able to exploit more constant and stronger winds that can be found at heights that other types of aeolian machines cannot reach; however, in order to fully take advantage of such situation, it is necessary that the airfoils reach the operating height even under situations with scarce or null winds on the ground. In experiments performed with the first prototypes of the generator, the airfoils have been launched at a height by exploiting the tension applied to cables by winches. One has to move the airfoil away from the generator, in parallel with the ground, and place it at a sufficient distance to recall it through winches, applying a sufficient dragging speed to the cables so that the wing develops such a lift intensity as to balance its own weight and generate the vertical acceleration component that causes its take-off and allow to controllably drive it along the rise trajectory till the operating height. This method is optimum for experimental activities, but it is scarcely practical for an installed machine, steady and operating with production purposes.

Object of the present invention is solving the above prior art problems: the preferable condition is the capability of taking-off and reaching the operating heights any time, automatically and independently from wind condition on the ground. The technical solution to such need consists in supplying the structure of the machine for launching a jet-type ventilation system, whose action can be summed with the action of the wind on the ground or integrally replace it to give to the flow abutting against the wind a minimum speed sufficient for taking-off and reaching the airfoils' operating height.

The type of implementation described herein provides for the use of a pair of axial fans put in a tube and actuated by electric motors. The van body can be oriented with an interlocked joint with two degrees of freedom. The fan jet can be oriented and combined in following the airfoils in their lifting phase. The system energy debit is scarce: it has been possible to compute that a consumption lower than 2 kWh with powers approximately equal to 200 kW is sufficient to launch the airfoil over 200 meters even under calm air conditions.

This arrangement can take advantage from information made available by meteo services, in order to choose the take-off direction and modulate the absorbed power during take-off. Such information can be acquired and processed automatically by the electronic control that will take care of the take-off manoeuvre. In order to complete the machine optimisation, and set a starting situation suitable for a take-off of airfoils which is assisted and supported by fans, a wing-supporting structure is necessary which, under starting conditions, pre-arranges the wing, orienting it in the space in the most suitable way to receive the flow of artificial ventilation, that will be able to be vector-summed in various proportions to the natural flow.

The structure must only perform the support of airfoil and itself under rest conditions. Under operating conditions, when the whole wind force operating on the wing is expressed on the control ropes, the structure must be able to be elastically deformed or must be able to be conveniently oriented through mechanical junctions, instead of rigidly opposing the operating forces, thereby reducing the lever arm on which the overturning moment is applied, and allowing a particularly light and economic structural dimensioning. The support structure implemented in this application is devised for remaining straight under rest conditions and pre-arranging the airfoil to correctly receive the natural or artificial ventilation flow. The use of two-rope airfoils requires that, under a rest position, waiting for take-off, the wing is completely deployed and suitably oriented with respect to natural wind or the sum of this latter one and the artificial wind generated by fans, in order to facilitate the manoeuvre at a maximum. For such purpose, two end arms are further provided, in addition to the tower, which can be opened as a compass, with suitable sizes depending on wing sizes.

The airfoil, at the beginning of the take-off stage, keeps a particular flight attitude in which the resultant of aerodynamic forces is mainly composed of the drag. By proceeding along the rise trajectory, when the height and consequently the atmospheric wind speed increases, the vector sum of flight speed and wind speed generates a relative speed, known as apparent wind, that allows the gradual transition, made by the electronic control, towards a flight attitude in which the resultant of aerodynamic forces is mainly composed of the lift. The airfoil, at the beginning of the take-off phase, is in a particular balance situation where the rotation around the axis represented by the rope bisecting line is one degree of freedom outside direct control, and could oscillate with cyclical rotations supplied by the wind: for this reason, it is important that the airfoil is set in a direction that is inertially kept for a sufficient time so that a minimum of aerodynamic lift occurs, and this enables the control to direct the airfoil in moving away and height acquiring manoeuvres. The tower with end arms will be downwind oriented, if there is a flow of natural air, since this guarantees that, in the take-off stage, no possible physical interferences occur between the structure and the airfoil moving away; the accurate alignment with the flow should further operate as an improvement on the latency time of the chance for controlling the airfoil during the lifting phase.

The procedure for recovering the airfoils is based on a quick rewinding of the ropes with an adequate length differential in order to use a manoeuvre that can be compared with a wing sliding where the airfoil lose height when it waves like a flag. The wind orienting system is adapted to be directly implemented on a rotary base that integrally carries both fans and tower. In this case, the tower has a single slanting direction, a single degree of freedom that can be decomposed into one or more consecutive hinged joints. Should orientation to wind direction occur at compass level, the tower must be constrained with a ball or universal joint, in order to omnidirectionally follow the compass setting. These movements and degrees of freedom must be adjusted with interlockings with reducers, or more simply, with elastic elements that generate a predetermined rest neutral position: typically, the tower at rest is straight and the compass is opened on an horizontal plane to the tower vertex.

In case of elastic elements, it could be necessary to add shock absorbers that dampen and absorb possible oscillations. An alternative embodiment to the articulated tower consists in a tower that approximates a pole made of sufficiently flexible material, or of a material with programmed flexibility that approximates the behaviour and purposes described in hinged, ball or universal joints. The version with flexible pole could be particularly suitable for aeolian machines with limited power, for single or individual users.

In case of natural wind flow with reduced speed, the airfoil is very sensitive to the high unstableness of the aerodynamic motion field, and has a strong dynamic instability at start-up, widely oscillating, till flight speed and lift reach adequate values. The electronic control will have available all dynamic data in real time for the possible oscillation, including acceleration, speed and position in the six degrees of freedom of the system. The control will be able to take care of it by actuating the length and length differential of cables, ventilation power and direction of jet-type devices. The aim is stabilising the take-off manoeuvre till such a height and wind speed are reached that sufficient flight speed and lift are guaranteed.

Another approach is delivering an important flow of air, choosing time on the instantaneous airfoil position, to reduce at a minimum the time in which it cannot be controlled. When the airfoil has reached sufficient winds to fly, the jet fans can be stopped and the rising manoeuvre to a height can go on till the operating height is reached, at the expense of the natural wind source. Once having reached the operating height, the take-off sub-program can leave the control to the main energy producing procedure. When producing, both tower and compass arms follow the rope that expresses the whole traction generated by the flying airfoil lift, the evident advantage is that the structures must not strongly oppose the force decompositions that would involve them. The variable structure geometry, being conformed to the rope path, reacts to external loads only with forces preset by springs or drives that tend to keep the tower normally straight and the compass normally open. The tower is slanted from the normally straight position towards the rope pull direction, highly lowering the overturning moment and reducing the need for a structure suitable to support the intensity of rope force decomposition. In fact, the lever arm to which the rope force is applied is not the tower height any more, but it is shortened next to the articulation.

Similarly the compass is closed and is oriented in order to be co-linear with the rope, the act of opposing the springs or drives that determine the rest position is a limited force that can be foreseen by the specification, and this allows also dimensioning pulleys, cable output and sliding system, taking into account only the maximum rope speed, but not the maximum tension, further mitigating the structural needs of the machine. Now the system role of the above described structure can be better pointed out, which efficiently intervenes imposing a predetermined geometry and position when the airfoil is at rest and there are no forces in the ropes, while it is arranged along the load direction minimising constraining and elastic reactions when the airfoil is flying, exerting the whole axial traction force along cables that can be referred to the aerodynamic airfoil lift.

This aeolian machine is completed by a machine room that contains driving winches for recovering the sliding power from ropes and rope accumulating and delivering spools. It must be noted that tasks are divided between rope accumulation and power winches, that allows not excessively loading the overlapping of layers of wound rope; the residual rope pull going out of the power winch must be stabilised with a pulley on a dandy roll, and the ordered rope distribution on the motored accumulating drum is obtained with an axial and synchronous sliding of the drum itself.

A way to drive forces from and to the ropes is given by a winch composed of a grooved cylinder with an helical worm on band. The higher the mechanical force to convert into rotating sliding, the more adequate is having a high number of wound revolutions. This type of winch can be driven with big-sized alternate motors mediated by revolution reducers/multipliers. However, energy efficiency evaluations require an optimised approach. It could be convenient to make many alternate motors with more reduced sizes operate in parallel, for evaluations both of efficiency and of power or cost. In this case, the topology of alternators can be organised in a star-type arrangement with axes parallel to the drum axis, and with a belt-type power transmission. In order to use plural alternators/motors with mechanical reducers, for example of the epicycloidal type, it is necessary to make batteries of alternators, that key-in the reducer and the pulley, arranged on a rope path that limits bend reversals to a minimum and that implements a segmented helical path, in order to improve the rope life.

The advantage of the battery of alternators consists in the solution modularity and the chance of specialising pulleys and power exchanged with the rope when the pull tension advances; in fact, on the airfoil side, the rope traction force is at a maximum, while on the accumulator side, tension is minimum. Therefore, pulleys can have different diameters in order to suit to the provided friction, and reducers and alternators can have progressive ratios or powers. The configurations of this type of winch can be of 2+2 counterposed systems of alternator-reducer-pulley, or 3+3 or still more 4+4. The systems are arranged mirror-wise in parallel planes and a system for each plane loses the radial coplanarity or the axial normality of the pulley to allow joining the rope to the sliding plane change.

The above and other objects and advantages of the invention, as will appear from the following description, are obtained with an infrastructure for tropospheric aeolian generator as described in Claim 1. Preferred embodiments and non-trivial variations of the present invention are the subject matter of the dependent claims.

These and other features of the present invention will clearly appear from the following description of a preferred embodiment, provided as a non-limiting example, with reference to the enclosed drawings, in which:

DETAILED DESCRIPTION

Figure 1:
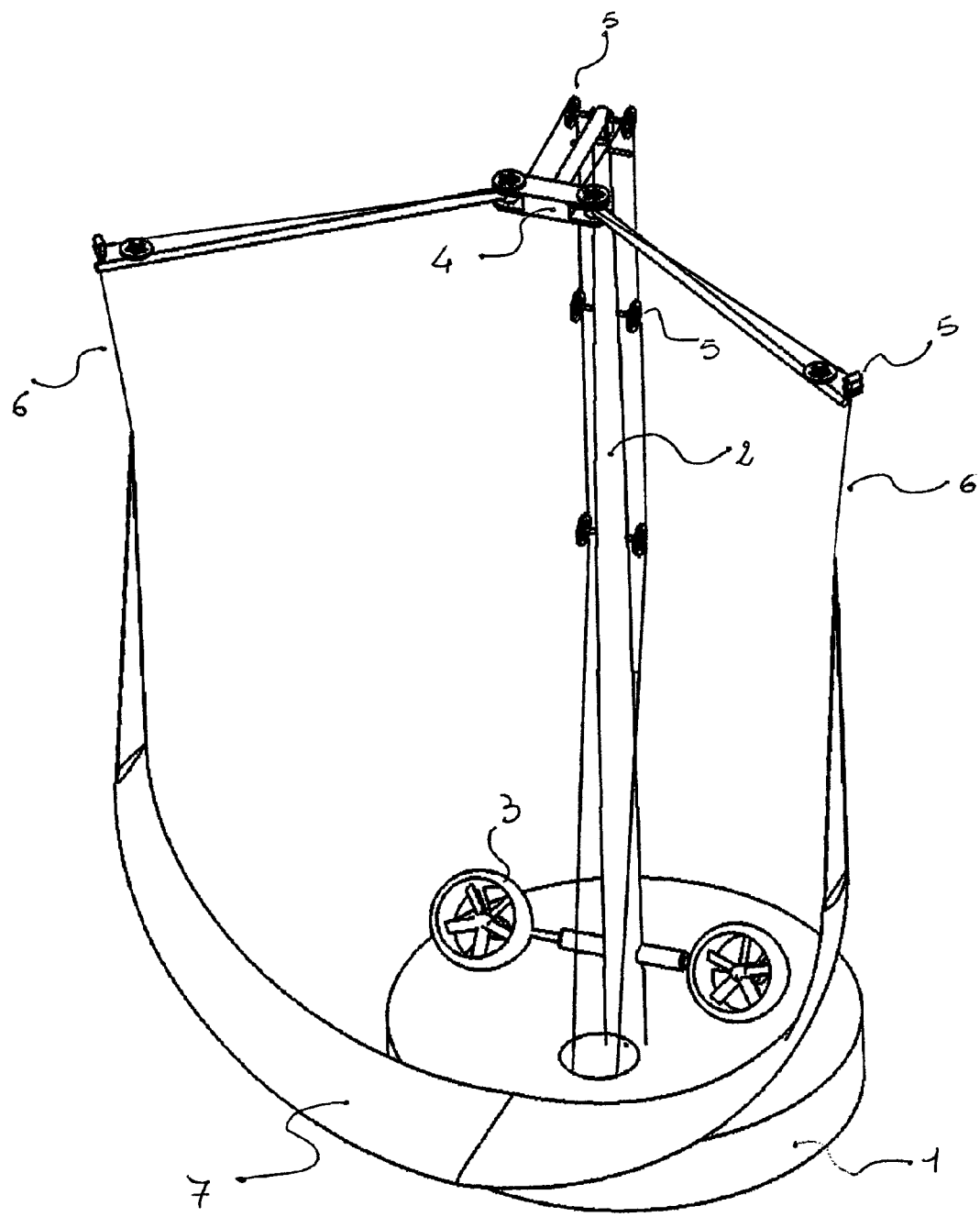
FIG. 1 is a perspective view of the aeolian generator according to the present invention in a step of its operating cycle.

With reference to FIG. 1, the infrastructure of an aeolian generator according to the present invention has five main components, respectively a rotary basement 1, an orientable arm 2, a jet-type ventilation plant 3, a variable-geometry system 4 for supporting the wing 7, and a driving system 5 of the control cables 6.

In this case, the cable driving system 5, composed of a set of pulleys, rollers and fairleads, is placed externally to the arm 2. Pulleys can be conveniently keyed-in next to joints of the articulated arm 2, or at the faced ends of the single sections. The generator is also composed of other sub-systems and plants, not shown here in the figure, for the electronic flight control, for converting mechanical energy into electric energy, for distributing produced energy to mains, that can be housed inside or outside the rotary basement.

The ventilation system 3, composed of a pair of jet-type fans, is anchored to the orientable arm 2 by means of a joint with two rotary degrees of freedom.

The arm 2, in its rest position, namely in the preparatory phases that precede the wing 7 take-off, is normally straight.

Figure 2:
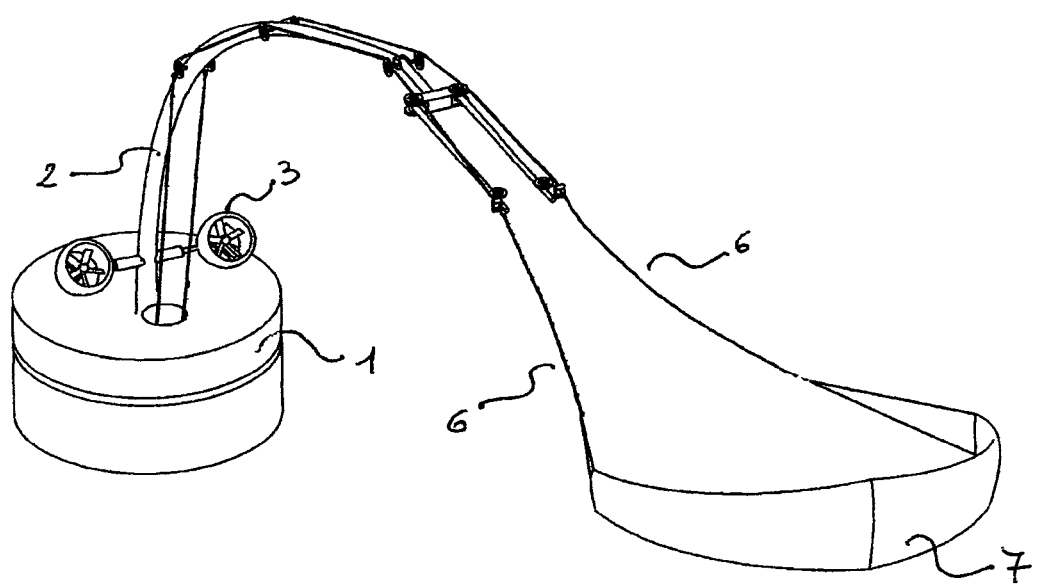
FIG. 2 is a perspective view of the aeolian generator according to the present invention in a step of its operating cycle.

In this case, with reference to FIG. 2, related to a wing flight phase, the orientable arm 2, composed of flexible and resistant material and designed according to criteria that allow obtaining a programmed deformation, assumes an inflected position determined by the tension operating on control cables 6 depending on aerodynamic actions on wing 7, in order to reduce the overturning moment intensity.

Figure 3:
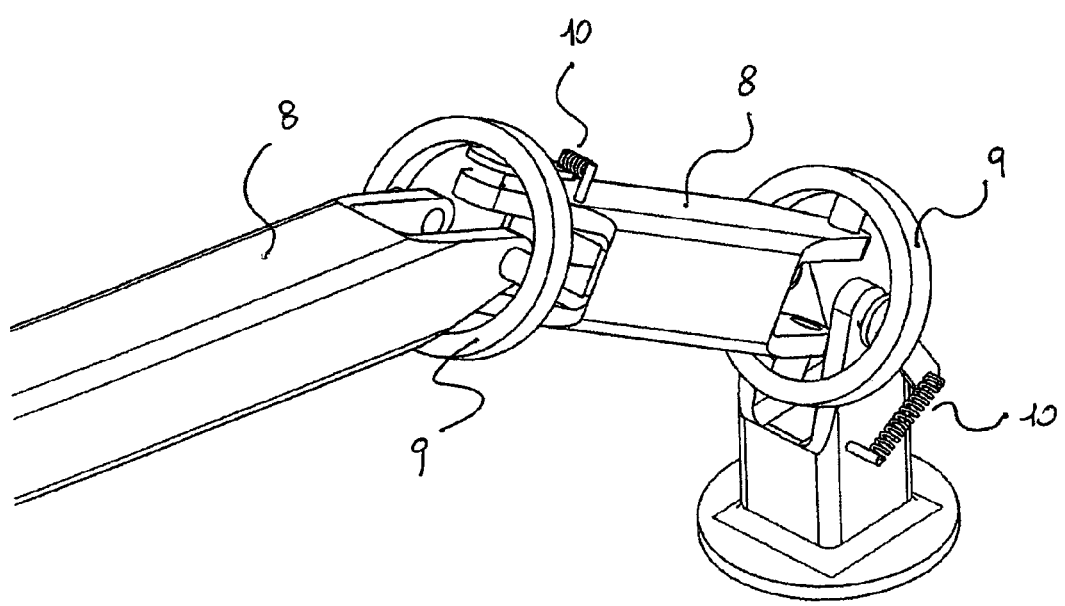
FIG. 3 is a perspective view of a part of the aeolian generator according to a variation of the present invention.

According to a variation, shown in FIG. 3, the orientable arm 2 is composed of many sections 8 mutually connected by universal joints 9.

In particular, the universal joints 9 have a spider external to the forks to allow inserting the cable driving system 5 inside the hollow section of the sections 8 of the arm 2 and in the arm 2 base.

The mutual position between basement 1 and individual sections 8 is regulated by a complex elastic system, for easiness shown in the figure through springs 10, that allows a programmed deformation of the structure due to the traction operating on the control cables 6.

According to a variation, not shown herein, the deformation of the arm 2 is controlled through servo-mechanisms.

According to a variation, not shown herein, the fans are anchored to the basement.

Figure 4:
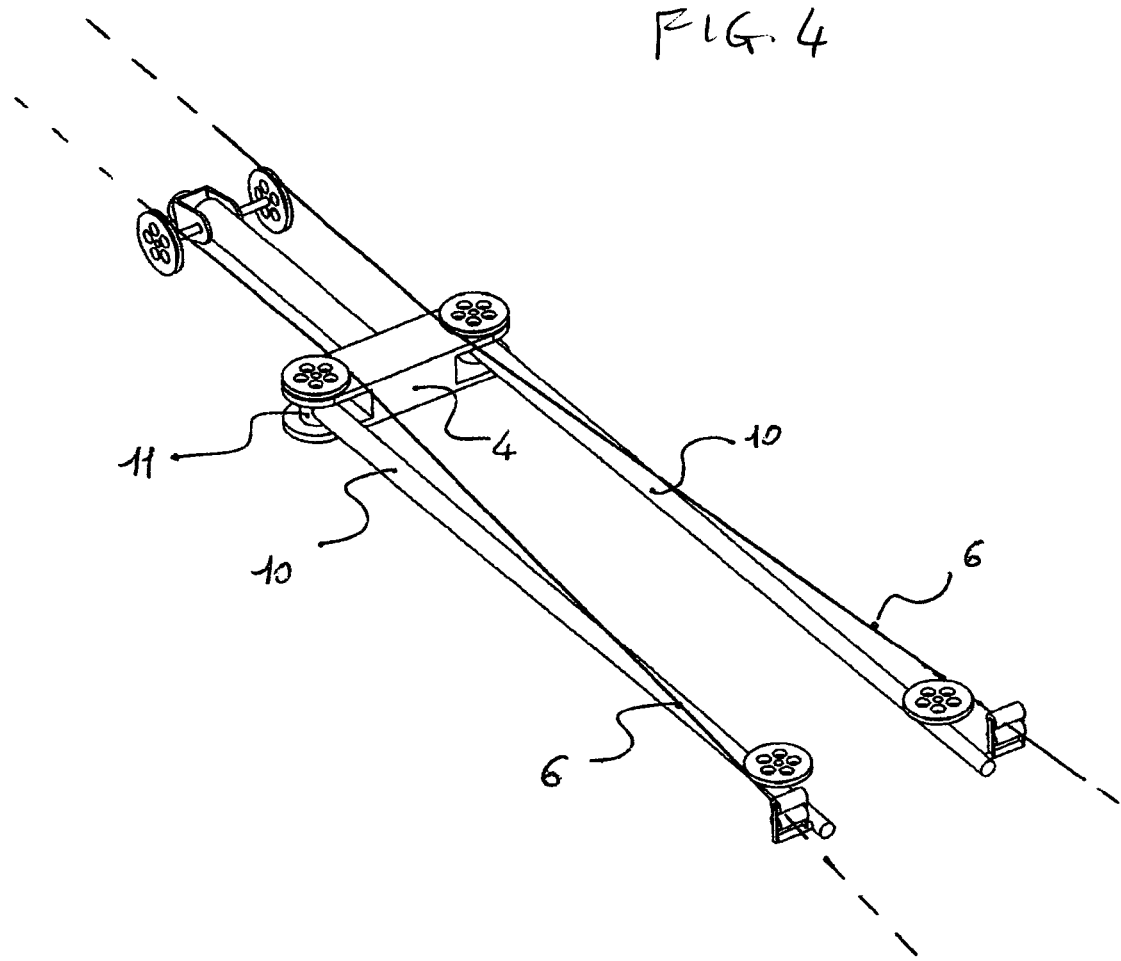
FIG. 4 is a perspective view of a part of FIG. 1.

With reference to FIG. 4, the variable-geometry system 4 for supporting the wing 7 with a compass-type opening is shown with its small arms 10 in a closed position, corresponding to the flight phases of the wing 7 in which the traction operating on the control cables 6 is sufficient to oppose the action of the torsional spring 11, that instead keeps the small arms 10 open when the traction operating on the cables is limited by the only weight of the wing 7.

According to a variation, not shown herein, the position of the small arms is controlled through servo-mechanisms.

Figure 5:
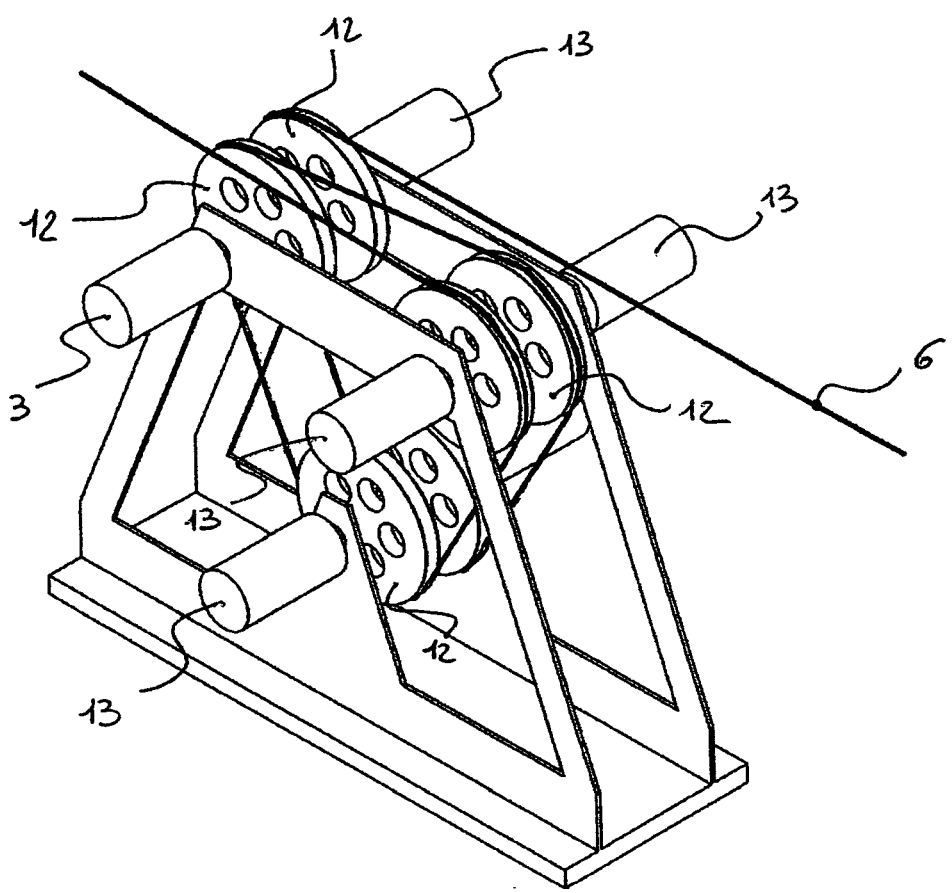
FIG. 5 is a perspective view of a part of the aeolian generator according to the present invention.

With reference to FIG. 5, a part of the system for driving and collecting the control cables 6 is shown, composed of a series of pulleys 12 actuated by motors 13, arranged in order to remove the fatiguing effects of the inverse flexure on control cables 6.

Figure 6:
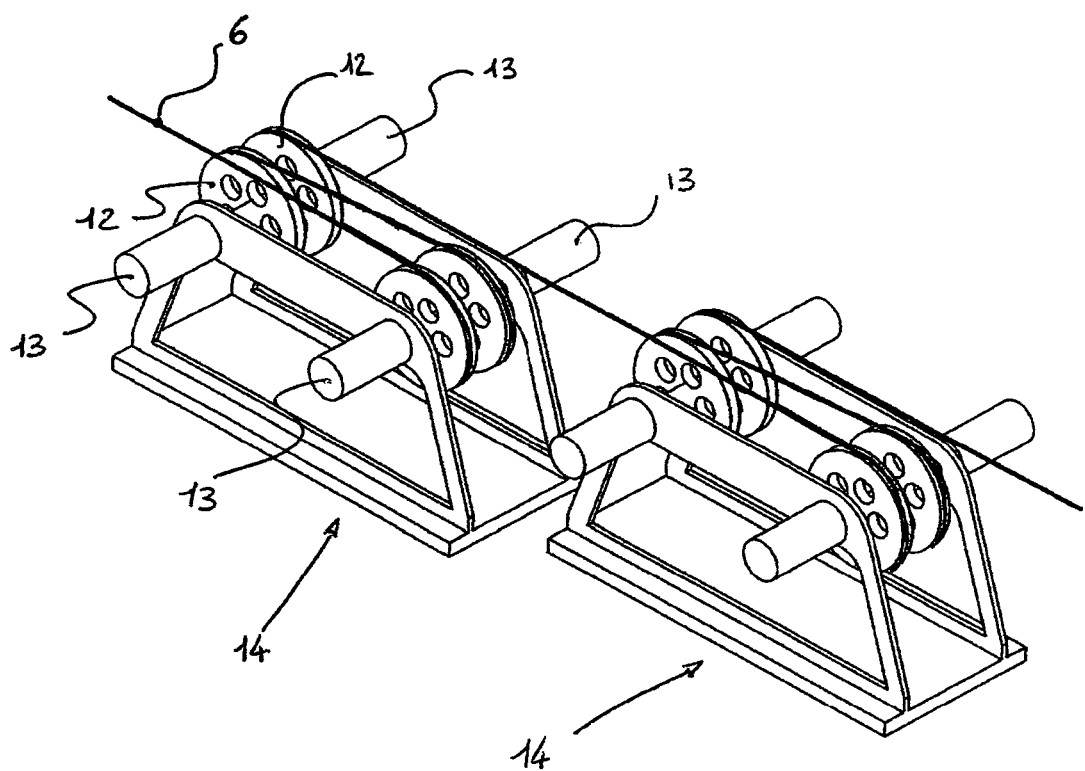
FIG. 6 is a perspective view of a part of the aeolian generator according to a variation of the present invention.

According to a variation, shown in FIG. 6, the motored pulleys 12 are organised in mutually similar modules 14 arranged in series in order to facilitate their assembling and reduce their overall dimensions.

The inventive infrastructure is also equipped with separating means (not shown) for the cables 6, adapted to prevent the cables 6 from mutually entangling.

Moreover, the cables 6, in their preferred form of use with the invention, can be made with a variable section and a variable composition.

The invention claimed is:

1. Infrastructure for tropospheric aeolian generator characterized in that the infrastructure comprises a rotary basement (1), at least one orientable arm (2), at least one system (4) for supporting at least one wing (7), and a driving system (5) of control cables (6) of the wing(7), at least one ventilation plant (3), said ventilation plant (3) being adapted to produce, when there is no atmospheric wind, an amount of artificial wind for making the wing (7) take-off, or being adapted to produce a portion of artificial wind necessary for making the wing (7) take-off when there is atmospheric wind.

2. Infrastructure for tropospheric aeolian generator according to claim 1, characterized in that the wing(7) is suspended in a position suitable for a take-off maneuver through cables (6) by means of the orientable arm (2) according to at least one degree of freedom.

3. Infrastructure for tropospheric aeolian generator according to claim 1, characterized in that the basement (1) is adapted to rotate around a vertical axis.

4. Infrastructure for tropospheric aeolian generator according to claim 1, characterized in that the system (4) for supporting the wing (7) in its take-off position is of a variable-geometry type.

5. Infrastructure for tropospheric aeolian generator according in its take-off position is comprised of at least two small arms (10) with a compass-type opening.

6. Infrastructure for tropospheric aeolian generator according to claim 1, characterized in that orientation and deformation of the orientable arm (2), is imposed by a traction operating on the control cables (6) of the wing (7).

7. Infrastructure for tropospheric aeolian generator according to claim 1, characterized in that the ventilation plant (3) is comprised of at least one axial fan.

8. Infrastructure for tropospheric aeolian generator according to claim 1, characterized in that the ventilation plant (3) is comprised of at least one centrifugal fan.

9. Infrastructure for tropospheric aeolian generator according to claim 1, characterized in that the ventilation plant (3) is comprised of at least one propeller.

10. Infrastructure for tropospheric aeolian generator according to claim 1, characterized in that the ventilation plant (3) is rested or anchored onto the ground.

11. Infrastructure for tropospheric aeolian generator according to claim 1, characterized in that the ventilation plant (3) is rested or anchored to the basement (1).

12. Infrastructure for tropospheric aeolian generator according to claim 1, characterized in that the cables (6) have a variable section.

13. Infrastructure for tropospheric aeolian generator according to claim 1, characterized in that the ventilation plant (3) is equipped with at least one degree of rotational or translational freedom.

14. Infrastructure for tropospheric aeolian generator according to claim 1, characterized in that the ventilation plant (3) is anchored onto the orientable arm (2).

15. Infrastructure for tropospheric aeolian generator according to claim 1, characterized in that the orientable arm (2) is made of flexible material.

16. Infrastructure for tropospheric aeolian generator according to claim 1, characterized in that the orientable arm (2) is comprised of a trellis-type structure or a tubular structure.

17. Infrastructure for tropospheric aeolian generator according to claim 1, characterized in that it is configured to prevent the cables (6) from mutually entangling.

18. Infrastructure for tropospheric aeolian generator according to claim 1, characterized in that the orientable arm (2) is comprised of many articulated sections (8).

19. Infrastructure for tropospheric aeolian generator according to claim 1, characterized in that the system (5) for driving the cables (6) is placed externally to the orientable arm (2).

20. Infrastructure for tropospheric aeolian generator according to claim 1, characterized in that the system (5) for driving the cables (6) is placed internally to the orientable arm (2).

21. Infrastructure for tropospheric aeolian generator according to claim 1, characterized in that the system (5) for driving the cables (6) is adapted to use motored pulleys (12) to reduce friction on cables (6) and cyclic fatigue effects.

22. Infrastructure for tropospheric aeolian generator according to claim 21, characterized in that, in the system (5) for driving the cables (6), torque applied to single motors (1) is adapted to be regulated independently by an electronic system.

23. Infrastructure for tropospheric aeolian generator according to claim 21, characterized in that, in the system (5) for driving the cables (6), the cables (6) are adapted to follow a path with cable flexures along a same direction.

24. Infrastructure for tropospheric aeolian generator according to claim 21, characterised characterized in that, in the system (5) for driving the cables (6), sets of motored pulleys (12) are organized in modules (14) that can be mutually connected in series.

25. Infrastructure for tropospheric aeolian generator according to claim 12, characterized in that the cables (6) have a variable composition.

* * * * *